Figure 1:
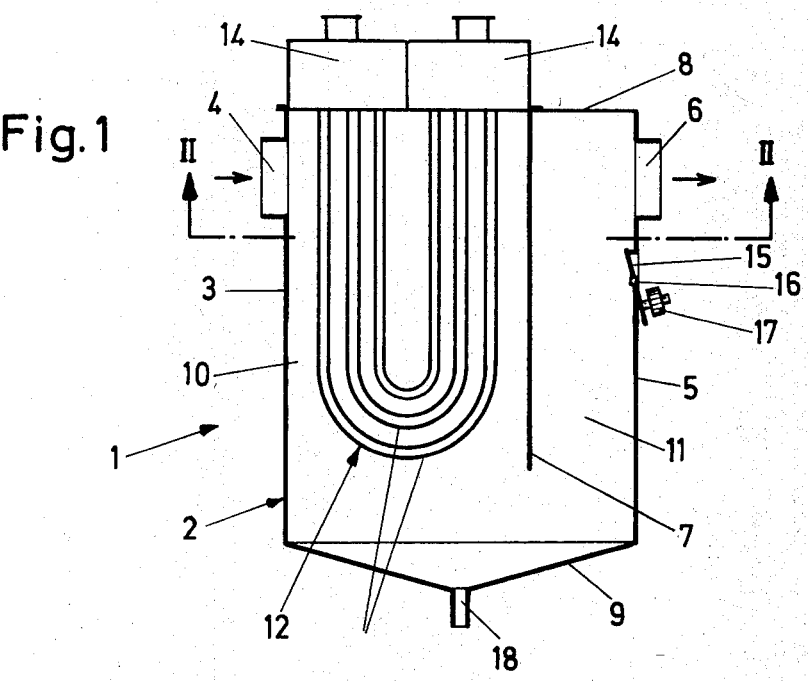

United States Patent [19]

Kremer

[11] 4,351,276

[45] Sep. 28, 1982

[54] HEAT RECOVERY DEVICE FOR BOILERS

[76] Inventor: Robert Kremer, Masshofstr. 22, 5090 Leverkusen 3, Fed. Rep. of Germany

[21] Appl. No.: 241,680

[22] Filed: Mar. 9, 1981

[30] Foreign Application Priority Data

Mar. 21, 1980 [DE] Fed. Rep. of Germany ....... 3010847

[51] Int. Cl.³ .............................................. F22B 33/00
[52] U.S. Cl. ................................. 122/20 B; 122/7 R; 165/DIG. 2; 237/19; 237/55
[58] Field of Search ................... 237/19, 55; 122/7 R, 122/20 B; 165/DIG. 2; 126/99 D, 111, 108, 99 R

[56] References Cited

U.S. PATENT DOCUMENTS

| | | | |
|---|---|---|---|
| 1,065,837 | 6/1913 | Reichhard | 122/20 B |
| 2,399,871 | 5/1946 | Johansson | 122/7 R |
| 3,913,663 | 10/1975 | Gates | 237/55 |
| 4,079,885 | 3/1978 | Decker | 237/55 |
| 4,090,474 | 5/1978 | Kauffmann | 122/20 B |
| 4,093,022 | 6/1978 | Polyak | 165/DIG. 2 |
| 4,103,735 | 8/1978 | Warner | 165/DIG. 2 |
| 4,117,883 | 10/1978 | Feldmann | 237/55 |
| 4,175,518 | 11/1979 | Reames | 122/20 B |
| 4,178,907 | 12/1979 | Sweat | 237/55 |
| 4,226,363 | 10/1980 | Sheldon | 165/DIG. 2 |

FOREIGN PATENT DOCUMENTS

| | | | |
|---|---|---|---|
| 562044 | 8/1923 | France | 165/DIG. 2 |
| 1041223 | 9/1966 | United Kingdom | 237/55 |

Primary Examiner—Daniel J. O'Connor
Attorney, Agent, or Firm—McGlynn and Milton

[57] ABSTRACT

A heat recovery device for boilers with a blower-type burner. A heat exchanger is located in the stack gas stream and through which is passed a medium to be heated and comprises a pot-shaped vessel (2) which can be inserted into the stack gas duct and is closed on all sides. A stack gas inlet (4) leads into the upper zone of the vessel (2) and at least one stack gas outlet (6, or 30 or 31) leads out of the upper zone of the vessel (2) at a distance from the inlet. A substantially vertical partition wall (7; 21) is located in the vessel (2) and extends downwards from the cover (8) of the vessel (2) and ends at a distance from the bottom (9) of the vessel to interrupt the direct stack gas path from the inlet (4) to the outlet (6). Thus, a siphon-type stack gas path is formed with an inlet chamber (10; 26) and an outlet chamber (11; 27). A draft-interruption damper (15; 32) is fitted in the outer vessel wall in the zone of the outlet chamber (11; 27).

10 Claims, 4 Drawing Figures

HEAT RECOVERY DEVICE FOR BOILERS

The invention relates to a heat recovery device for boilers, in particular for boilers with a blower-type burner, having a heat exchanger which is located in the stack gas stream and through which is passed a medium which is to be heated up.

In a known heat recovering device of the said type, in which the heat exchanger surfaces are located in the direct stack gas path from the boiler to the stack, the boiler and also the heat exchanger cool down substantially during the shut-down periods of the furnace. The desired effect of heat recovery is thus partially cancelled by the large losses at the outlet to the stack. The cooling losses to the stack are very important in conventional units in which the maximum number of operating hours of the furnace is 2,000 hours per year, compared with a standby period, while shut down, of about 6,000 hours per year.

As a counter-measure against excessive cooling losses to the stack, while shut down, the installation of motorized dampers in the stack gas path has been disclosed. Stack gas dampers of this type are, however, relatively involved and expensive, so that they are frequently unprofitable since the expense bears no relation to the achieved saving in heat.

It is therefore the object of the invention to provide a heat recovery device which, by simple means, counteracts the shut-down losses, in particular those caused by cooling of the boiler above the flue.

According to the invention, this object is achieved by a heat recovery device which comprises a pot-shaped vessel which can be inserted in the stack gas duct and is closed on all sides, a stack gas inlet leading into the upper zone of the vessel, a stack gas outlet leading out of the upper zone of the vessel at a distance from the inlet, a substantially vertical partition wall which is located in the vessel, extends downwards from the cover of the vessel, ends at distance from the bottom of the vessel and interrupts the direct stack gas path from the inlet to the outlet in such a way that a siphon-type stack gas path with an inlet chamber and an outlet chamber is formed, and a draft-interruption damper fitted in the outer vessel wall in the zone of the outlet chamber.

Due to the siphon-type design of the pot-shaped heat recovery vessel, a thermal barrier which prevents cooling of the boiler, is formed, while the burner is shut down. Even in the case of a strong draft in the stack, the thermal barrier can be maintained because fresh air is drawn in, in the zone of the outlet chamber, through the draft-interruption damper. This ensures at the same time that the stack is always aired. As a result of the pressure surge generated on ignition of the burner, the draft-interruption damper is closed so that stack gases cannot pass into the firing chamber.

Preferably, the heat exchanger is located in the inlet chamber of the heat recovery vessel. The result of this is that the heat exchanger also benefits from the thermal barrier and is largely protected from cooling during the shut-down periods of the burner.

The heat exchanger can be composed of tubes which are bent in the shape of hairpins and extend downwards from a plenum chamber system into the inlet chamber of the pot-shaped vessel. During operation of the burner, there is thus an intensive flow of the downward-flowing stack gases around the tubes.

Advantageously, an opening for draining condensate liquid which may have formed is provided at the lowest point of the bottom of the pot-shaped vessel.

The stack gas outlet can be located on that side of the pot-shaped vessel which is opposite the stack gas inlet. In this construction, the draft-interruption damper can be fitted below the stack gas outlet.

In a preferred embodiment, the vertical partition wall forming the siphon has an arcuate or otherwise curved shape, the concave side of the partition wall facing the inlet chamber. In this embodiment, the pot-shaped vessel has, in the zone of the outlet chamber, preferably three outlet openings which are located at the level of the inlet opening and can be closed as desired. It is also possible for draft-interruption dampers to be installed in the outlet openings, if desired.

Advantageously, the draft-interruption damper is pivotable about a substantially horizontal axis and, by virture of an adjustable balance weight, is in the open position when the burner is shut down, and is in the closed position when the burner is operating.

Figure 2:
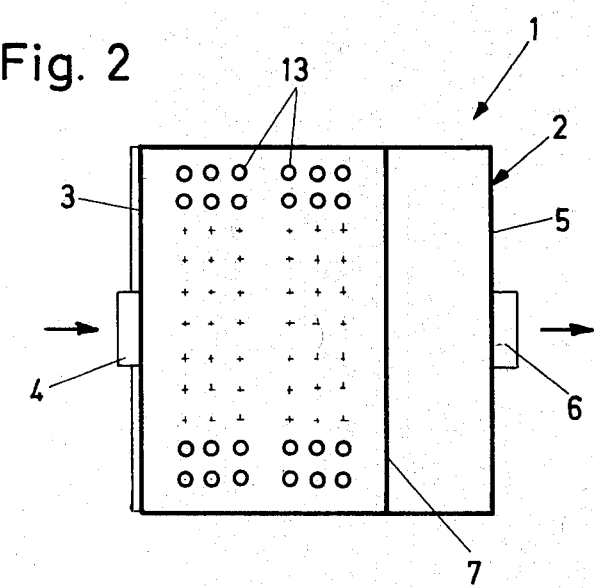
Figure 3:
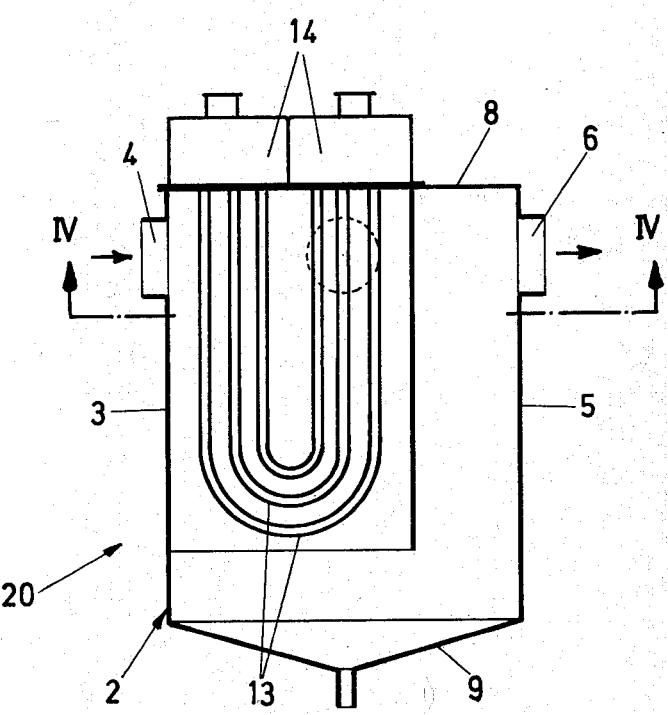
Figure 4:
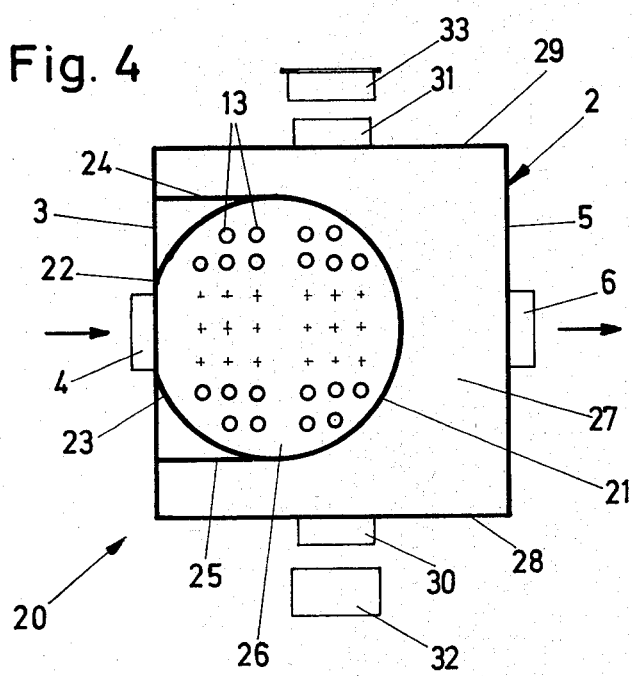

The invention is illustrated in the drawing by way of example and, in the following text, it is described in detail by reference to the drawing in which:

FIG. 1 shows a vertical section through an embodiment of a heat recovery device, FIG. 2 shows a section along the line II—II in FIG. 1, FIG. 3 shows a vertical section through another illustrative embodiment of the heat recovery device and FIG. 4 shows a section along the line IV—IV in FIG. 3.

According to FIGS. 1 and 2, the heat recovery device 1 is constituted by a pot-shaped vessel 2 which is closed on all sides and has substantially square cross-section. A stack gas inlet opening 4 is provided in the upper zone of one side wall 3 of the pot-shaped vessel 2. A stack gas outlet opening 6 is located in the upper zone of the opposite side wall 5.

In the interior of the pot-shaped vessel, there is a vertical partition wall 7 which extends downwards from the cover 8 of the pot-shaped vessel 2 across the entire width of the vessel and ends at a distance from the bottom 9 of the vessel. The direct stack gas path from the stack gas inlet opening 4, connected to the boiler, to the stack gas outlet opening 6 connected to the stack, is interrupted by the partition wall 7. At the same time, the interior of the vessel 2 is sub-divided by the partition wall 7 into a stack gas inlet chamber 10 and a stack gas outlet chamber 11, siphon-type stack gas path being formed which leads from the inlet opening 4 through the inlet chamber 10, underneath the partition wall 7 into the outlet chamber 11 and to the outlet opening 6.

The stack gas inlet chamber 10 is made larger than the outlet chamber 11 and serves at the same time to receive a heat exchanger 12. The latter is composed of a plurality of tubes 13 which are bent in the shape of hairpins and extend from a plenum chamber system 14 located on the top of the vessel 2 downwards into the stack gas inlet chamber 10, the downward-flowing hot stack gases flowing around the tubes.

Below the stack gas outlet opening 6, an opening is located in the outer vessel wall, which opening is provided with a draft-interruption damper 15 and through which fresh air can be drawn in during shut-down periods of the burner. The draft-interruption damper 15 is pivotable about a horizontal axis 16 and is provided with an adjustable balance weight 17. The balance weight 17 can be adjusted in such a way that the damper 15 is in the open position when the burner is shut down, and is in the closed position when the burner is operating. When the pressure rises in the vessel 2, in particular during the ignition phase of the burner, the damper 15 can close automatically so that stack gases cannot pass into the firing chamber.

The bottom 9 of the vessel 2 slopes slightly downwards towards its center and, at its lowest point, it is provided with an outlet opening 18 so that condensate liquids which may form can drain off.

In FIGS. 3 and 4, a further illustrative embodiment of a heat recovery device 20 is shown. In the following description of the device, the parts which are identical to those of the illustrative embodiment shown in FIGS. 1 and 2 have been provided with the same reference numbers.

In this illustrative embodiment, the pot-shaped vessel 2 provided is also closed on all sides, has a substantially square cross-section and is provided with a stack gas inlet 4 in the upper zone of one side wall 3, and with a stack gas outlet 6 in the upper zone of the opposite side wall 5.

In the present case, however, the partition wall 21 extending downwards from the cover 8 does not run parallel to the side walls 3 and 5 of the vessel 2, but has an arcuate shape curving around the stack gas inlet opening 4. The lateral ends 22 and 23 of the arcuate partition wall 21 are welded to the side wall 3. Moreover, two supporting metal sheets 24 and 25, which are welded on one side to the arcuate partition wall and, on the other side, to the side wall 3 of the vessel 2, serve as an additional fixing.

In this illustrative embodiment, the concave side of the partition wall 21, together with the side wall 3 of the vessel 2, forms the inlet chamber 26 in which the heat exchanger tubes 13 bent in the shape of hairpins are accommodated, the latter starting from a plenum chamber system 14 located on the top of the vessel, in the same way as in the illustrative embodiment described in the preceding text.

Due to the curvature of the partition wall, the outlet chamber 27 also extends over the entire length of the two other side walls 28 and 29. In these two side walls 28 and 29, two further outlet openings 30 and 31 located in the center are arranged at the same level as the inlet and outlet openings 4 and 6. As a result of this design, there are very many possibilities for the installation of the vessel 2. That outlet opening which is in the most favorable position relative to the stack can in each case be used as the stack gas outlet. If, as shown in the drawing, the outlet opening 6 is to be connected to the stack, a draft-interruption damper 32 can be fitted in the outlet opening 30, whilst the other outlet opening 31 is closed by a cover 33. Likewise, however, it is also possible to place the draft-interruption damper 32 on the outlet opening 31 or to provide draft-interruption dampers on both sides.

What is claimed is:

1. A heat recovery device for boilers, in particular for boilers with a blower-type burner, having a heat exchanger which is located in the stack gas stream and through which is passed a medium which is to be heated up, which comprises a pot-shaped vessel (2) which can be inserted in the stack gas duct and is closed on all sides, a stack gas inlet (4) leading into the upper zone of the vessel (2), at least one stack gas outlet (6, or 30 or 31) leading out of the upper zone of the vessel (2) at a distance from the inlet, a substantially vertical partition wall (7; 21) which is located in the vessel (2), extends downwards from the cover (8) of the vessel (2), ends at a distance from the bottom (9) of the vessel and interrupts the direct stack gas path from the inlet (4) to the outlet (6) in such a way that a siphon-type stack gas path with an inlet chamber (10; 26) and an outlet chamber (11; 27) is formed, and a draft-interruption damper (15; 32) fitted in the outer vessel wall in the zone of the outlet chamber (11; 27).

2. A heat recovery device as claimed in claim 1, wherein the heat exchanger (12) is located in the inlet chamber (10; 26).

3. A heat recovery device as claimed in claim 2, wherein the heat exchanger (12) is composed of tubes (13) which are bent in the shape of hairpins and extend downwards from a plenum chamber system (14) into the inlet chamber (10; 26) of the pot-shaped vessel (2).

4. A heat recovery device as claimed in any of claims 1 to 3, wherein an opening (18) for draining condensate liquid is provided at the lowest point of the bottom (9) of the pot-shaped vessel (2).

5. A heat recovery device as claimed in any of claims 1 to 3, wherein the stack gas outlet (6) is located on that side of the pot-shaped vessel (2) which is opposite the stack gas inlet (4).

6. A heat recovery device as claimed in any of claims 1 to 3, wherein the draft-interruption damper (15) is fitted below the stack gas outlet (6).

7. A heat recovery device as claimed in any of claims 1 to 3, wherein the vertical partition wall (21) has an arcuate or otherwise curved shape, the concave side of the partition wall facing the inlet chamber (26).

8. A heat recovery device as claimed in any of claims 1 to 3, wherein the draft-interruption damper (15; 32) is pivotable about a substantially horizontal axis (16) and, by virtue of an adjustable balance weight (17), is in the open position when the burner is shut down, and is in the closed position when the burner is operating.

9. A heat recovery device as claimed in claim 7, wherein the pot-shaped vessel (2) has, in the zone of the outlet chamber (27), three outlet openings (6, 30, 31) which are located at the level of the inlet opening (4), are distributed around the periphery of the vessel (2) and can be closed by a cover (33) as desired.

10. A heat recovery device as claimed in claim 9, wherein a draft-interruption damper (32) can be fitted in the outlet openings (3) as desired.

* * * * *